US007822254B2

(12) United States Patent
Yatziv et al.

(10) Patent No.: US 7,822,254 B2
(45) Date of Patent: Oct. 26, 2010

(54) AUTOMATIC POSITIONING OF MATCHING MULTI-PLANAR IMAGE REFORMATTING (MPR) VIEWS OF MULTIPLE 3D MEDICAL IMAGES

(75) Inventors: Liron Yatziv, Plainsboro, NJ (US); Yiyong Sun, Lawrenceville, NJ (US); Chenyang Xu, Allentown, NJ (US); Frank Sauer, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 876 days.

(21) Appl. No.: 11/695,096

(22) Filed: Apr. 2, 2007

(65) Prior Publication Data

US 2007/0274582 A1 Nov. 29, 2007

Related U.S. Application Data

(60) Provisional application No. 60/793,867, filed on Apr. 21, 2006.

(51) Int. Cl.
*G06K 9/00* (2006.01)
(52) U.S. Cl. .......................... 382/131; 345/419
(58) Field of Classification Search .................. 382/128, 382/129, 130, 131, 132, 133, 134, 154, 276, 382/294; 378/4, 21–27, 62, 901; 600/407, 600/410, 423, 427; 128/916, 920, 922; 345/419, 345/424

See application file for complete search history.

(56) References Cited

U.S. PATENT DOCUMENTS 4,882,679 A * 11/1989 Tuy et al. ..................... 600/425

| 6,898,302 | B1 * | 5/2005 | Brummer ..................... 382/131 |
| 7,003,175 | B2 * | 2/2006 | Paladini ....................... 382/276 |
| 2005/0078881 | A1 | 4/2005 | Xu et al. |
| 2005/0094898 | A1 | 5/2005 | Xu et al. |
| 2005/0203372 | A1 | 9/2005 | Janssen et al. |
| 2005/0249398 | A1 | 11/2005 | Khamene et al. |

(Continued)

FOREIGN PATENT DOCUMENTS

EP 1 643 444 A 4/2006

OTHER PUBLICATIONS

Ceylan C Ei Al: "Note; Assessment of rigid multi-modality image registration consistency using the multiple sub-volume registration (MSR) method; Image registration Consistency assessment using MSR" Physics in Medicine and Biology, Taylor and Francis Ltd. London, GB, vol. 50, No. 10, (May 21, 2005), pp. N101-N108, XP020084206 ISSN: 0031-9155 p. N102, line 18, paragraph 1—p. N104, last line p. N1O5, paragraph 2.2—p. N106, paragraph 2.3 figures 1,2.

(Continued)

*Primary Examiner*—Abolfazl Tabatabai
(74) *Attorney, Agent, or Firm*—Donald B. Paschburg

(57) ABSTRACT

A computer-implemented method is disclosed for comparing three dimensional (3D) digital medical images. The method uses a reference MPR to position subsequent MPRs in one or more other 3D digital medical images so their content matches the reference MPR. The matched MPRs may then be used by a medical professional to diagnose a patient condition. The ability to quickly and automatically position matching MPRs for multiple 3D images eases the medical staff workload and shortens diagnostics time. Matching MPRs provides an effective way to view the 3D volumes for anatomical changes over time and to monitor medical conditions such as stenosis and tumors.

20 Claims, 3 Drawing Sheets

U.S. PATENT DOCUMENTS

2005/0272991 A1 12/2005 Xu et al.
2006/0159323 A1 7/2006 Sun et al.
2006/0188139 A1 8/2006 Khamene et al.
2006/0245645 A1 11/2006 Yatziv et al.

OTHER PUBLICATIONS

Kim B Ei Al: "Motion Correction in FMRI Via Registration of Individual Slices Into an Anatomical Volume" Magnetic Resonance in Medicine, Academic Press, Duluth, MN, US, vol. 41, No. 5, (May 1, 1999), pp. 964-972, XP000824010 ISSN: 0740-3194 p. 964, left-hand col., line 30—right-hand col., line 32, p. 965, left-hand col., line 18—p. 966, right-hand col., last line, figure 3.

Kessler ML Ei Al: "Integration of Multimodality Imaging Data for Radiotherapy Treatment Planning" International Journal of Radiation: Oncology Biology Physics, Pergamon Press, US, vol. 21, No. 6, (Nov. 1, 1991), pp. 1653-1667, XP000670886 ISSN: 0360-3016, p. 1654, left-hand col., line 32—p. 1655, right-hand col., last line figure 1.

Rajasekar 0 Ut Al: "A graphical user interface for automatic image registration software designed for radiotherapy treatment planning" Medical Dosimetry, Elsevier, US, vol. 29, No. 4, (Jan. 1, 2004), pp. 239-246, XP004942087 SSN: 0958-3947 p. 239, left-hand col., line 1—p. 240, right-hand col., last line figure 1 p. 242, left-hand col., line 25—p. 243, left-hand col., last line figure 3 p. 244, left-hand col., line 18—p. 245, right-hand col., last line figure 6.

* cited by examiner

AUTOMATIC POSITIONING OF MATCHING MULTI-PLANAR IMAGE REFORMATTING (MPR) VIEWS OF MULTIPLE 3D MEDICAL IMAGES

CROSS-REFERENCE TO RELATED APPLICATIONS

This is a U.S. non-provisional application of U.S. provisional patent application Ser. No. 60/793,867, filed Apr. 21, 2006, by Yatziv et al., the entirety of which application is incorporated herein by reference.

FIELD OF THE INVENTION

This invention relates to a system and method for matching three dimensional volumes for monitoring anatomical changes in a patient over time, and more particularly to a system and method for automatically matching reference volumes of multiple medical images taken over time.

BACKGROUND OF THE INVENTION

The computing of planar oblique cross-sections from a three-dimensional array of data is commonly referred to as multi-planar reformatting ("MPR"), may also be referred as multiplaner reconstruction. The data used for MPR images can be obtained from medical tomographic scanners such as magnetic resonance imaging ("MRI"), computed tomography ("CT"), positron emission tomography ("PET"), or other apparatus capable of producing a series of slices in a grid-like array.

When monitoring/diagnosing a medical condition or therapy, medical staff (here denoted as user) require two or more of the same MPRs from these three-dimensional arrays of data (referred to herein as "volumes") scanned previously at different points in time. This is an effective way to view and compare the 3D volumes for anatomical changes over time. For example, a developing tumor may be detected, measured, and monitored over time, as can its effect on the surrounding region. In another example, stenosis—an abnormal narrowing in a blood vessel—may require MPR comparison of two or more CT scans to diagnose. Positioning an MPR from a subsequent scan to match a reference MPR in the reference volume (or "baseline" volume) is a demanding task when done manually, due to the multiple orientation and shift adjustments required to obtain a particular MPR position within the volume under consideration.

Currently, there is no alternative to the manual process, which requires talent and knowledge of the anatomies to provide an accurate result. Still, the manual process is lengthy and cumbersome. Furthermore, the manually positioned MPR is often not consistent and is not repeatable, since the manual positioning process is inexact, relying on the "eye" of the user to align subsequent MPRs with the reference MPR. As a result, the outcome of the comparison may differ significantly between practitioners.

Thus, there is a need for a system and method that solves this problem for 3D digital medical images by automatically finding matching MPRs and allowing the medical staff/user to perform only the rather simple final tuning, if necessary.

SUMMARY OF THE INVENTION

The invention enables quick and efficient positioning of multiple MPRs of substantially the same content from one or more 3D digital medical images (here denoted as volumes). MPR is a technique widely used to view volumes, providing the facility for an arbitrarily positioned and oriented 2D plane to be placed in a 3D volume so that the projection of the data on that plane may be viewed. The MPR may be adjusted by changing its position and orientation in three dimensions. Those MPRs may be reconstructed from any volume such as but not limited to CT scan, MRI scan, DynaCT and the like.

In particular, a method is disclosed for automatically matching medical digital images. The method may comprise: providing a first digitized volume; providing a second digitized volume; obtaining a first MPR from the first digitized volume; obtaining a second MPR from the second digitized volume; and positioning the second MPR adjacent to the first image to compare the first and second MPRs. The method may further comprise computing a comparison score that represents a correspondence between at least a portion of each of the first and second MPRs; determining whether the comparison score is within a predetermined range; and identifying the second MPR as a matching MPR if the comparison score is within the predetermined range; or obtaining a third MPR from the second digitized volume if the comparison score is not within the predetermined range.

A system for automatically matching medical digital images is also disclosed, comprising means for providing a first digitized volume, means for providing a second digitized volume, means for obtaining a first MPR from the first digitized volume, means for obtaining a second MPR from the second digitized volume, and means for positioning the second MPR adjacent to the first MPR to compare the first and second MPRs. The system may further comprise means for computing a comparison score that represents a correspondence between at least a portion of each of the first and second MPRs; means for determining whether the comparison score is within a predetermined range; and means for identifying the second MPR as a matching MPR if the comparison score is within the predetermined range; or means for obtaining a third MPR from the second digitized volume if the comparison score is not within the predetermined range.

Further disclosed is a machine readable storage device tangibly embodying a series of instructions executable by the machine to perform a series of steps. The steps may comprise: providing a first digitized volume; providing a second digitized volume; obtaining a first MPR from the first digitized volume; obtaining a second MPR from the second digitized volume; and positioning the second MPR adjacent to the first MPR to compare the first and second MPRs. The steps may further comprise computing a comparison score that represents a correspondence between at least a portion of each of the first and second MPRs; determining whether the comparison score is within a predetermined range; and identifying the second MPR as a matching image slice if the comparison score is within the predetermined range; or obtaining a third MPR from the second digitized volume if the comparison score is not within the predetermined range.

BRIEF DESCRIPTION OF THE DRAWINGS

The accompanying drawings illustrate preferred embodiments of the invention so far devised for the practical application of the principles thereof, and in which.

DETAILED DESCRIPTION

This section introduces the changes in user workflow when using the inventive system for comparison of MPRs in contrast to the prior manual workflow. Secondly, the system input and output are described. Finally, a specialized algorithm is presented as an exemplary method for implementing the invention.

Figure 1A:
FIGS. 1A-1D are MPR's of four separate CT volumes constructed at different points in time; the MPRs have been "matched" to show the progression of stenosis of a blood vessel over time.
Figure 1B:
Figure 1C:
Figure 1D:

Referring to FIGS. 1A-D, an exemplary plurality of successive medical images (MPRs) are shown for use in diagnosing arterial stenosis. FIG. 1A illustrates the pulmonary vein and it's width (diameter) that is being observed for changes due to stenosis. FIG. 1B shows an MPR of a CT scan taken at time T=0. FIGS. 1C and 1D are matching MPRs that were automatically retrieved using the inventive method, and represent images constructed from CT scans taken at time T=three months, and T=six months, respectively. The development of stenosis can be easily identified by the user when comparing these successive MPRs.

1. Workflow

Figure 2:
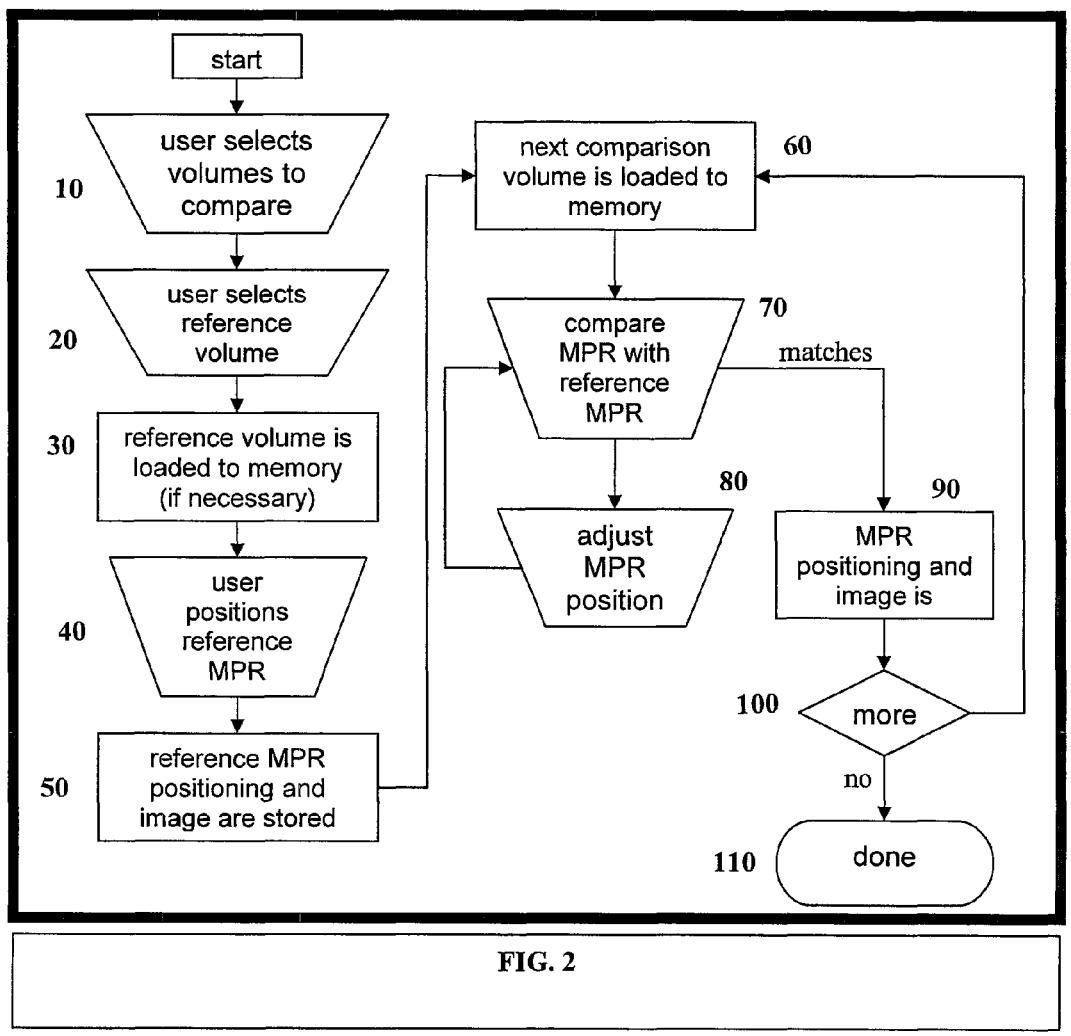
FIG. 2 is a flow chart showing the workflow of one embodiment of the inventive system.

Referring to FIG. 2, the fundamental workflow of the invention will be described. The process starts at 10, in which several volumes to be compared are selected. Typically these volumes will be built from scans (e.g., CT, MRI, PET) of a portion of a patient's anatomy which have been taken at different points in time (e.g., over the span of several months). The individual volumes will be stored as data files on the user's computer, server or other appropriate storage device. At 20, the user selects a "reference" volume, i.e., the volume from which a baseline or "reference" MPR is constructed. The reference MPR may be taken as the origin, or starting point, from which subsequent MPRs may be judged in order to diagnose a developing condition such as progressive stenosis or tumor. In one exemplary embodiment, the "reference" volume represents a scan taken at an earlier point in time than the scans used to construct the subsequent volumes.

If not already done, the reference volume must be loaded to memory for viewing, at 30. The user may then manually position (i.e., rotate, shift, etc.) the reference MPR view at 40 to center the "region of interest" on the screen. Thus, in the exemplary embodiment illustrated in FIGS. 1A-1D, the region of interest is a blood vessel adjacent to the heart in which a stenosis condition is suspected.

In addition to manually centering the reference MPR on the screen, the user may optionally supply additional marking (e.g., mouse clicks, scribble) or other information (e.g., coordinates) to further identify the region of interest. At 50, the reference MPR is then either stored for later use, or kept in memory for immediate use in comparing with subsequent MPRs.

With the prior manual process, the user would then be required to load each subsequent comparison volume into memory, if they are not already stored in memory. The user would then manually adjust the subsequent MPR slice taken from a subsequent "comparison" volume by iteratively comparing that subsequent "comparison" MPR with the reference MPR. This iterative process may be painstaking and is very time consuming, since the user must adjust the comparison MPR about 3 mutually-orthogonal axes of rotation within the comparison volume to obtain the most accurate positioning with respect to the reference MPR. When a satisfactory match is found (i.e., one which the user qualitatively believes to be "close enough" to the reference MPR to perform the desired comparison), the "matching" MPR is then stored for later use, or kept in memory for immediate comparison. The next comparison volume may be processed in the same manner until a plurality of comparison MPR's (typically one from each comparison volume) are obtained for viewing (FIGS. 1B-1D).

With the inventive system, the operations associated with identifying the appropriate comparison MPRs, such as those shown in FIGS. 1A-D, are enhanced so that more accurate MPRs can be obtained from each volume used in the comparison. Thus, at 60, the system loads a comparison volume into memory and an initial "guess" is made as to a possible matching MPR position within the comparison volume. This MPR guess can be informed by a number of factors, including user input of a "region of interest," or other information about MPR location in the reference volume. The "guess" MPR is then compared to the reference MPR and a comparison score is obtained at 70. If the comparison score of the "guess" MPR is outside of a predetermined range, then the "guess" MPR is adjusted at 80. This adjustment step may comprise slightly altering the position of the MPR slice within the comparison volume, and this adjusted guess MPR is compared 70 with the reference MPR to obtain a new comparison score. This iteration is performed until the comparison score falls within the predetermined range, whereupon the MPR is deemed to be "matching" and the matching MPR image and/or locational information is stored at 90.

This process is repeated for as may comparison volumes as are selected by the user. Thus, at 100, a determination is made at 100 as to whether additional comparison volumes exist, and if so, the next comparison volume is loaded into more 60 and the process repeats to obtain another "matching" MPR from the new comparison volume. The process continues until there are no more comparison volumes 110.

One substantial advantage to the inventive system is that the loading of the comparison volumes to memory can be done more efficiently, since only a portion of the volume needs to be loaded. With the prior manual process, the user is required to load the entire volume so that it can be manually scanned for an MPR that matches the reference MPR. Due to the substantial amount of data associated with a typical volume, a large amount of memory is required and overall processing speeds can be slow.

With the inventive system, only a portion of each of the comparison volumes needs to be loaded to memory. This is because once the reference MPR is identified, the general location of the comparison MPRs within their respective volumes can be estimated (within a certain range), so that only the portion of each comparison volume that lies within that range (which can be thought of as a "thick slice" of the comparison volume) need be loaded to memory. This technique reduces the total amount of memory required to perform the desired comparisons, and facilitates faster processing, resulting in an overall more efficient and faster operation.

Once the matching MPRs from each associated comparison volume are identified and saved, the user can then view the matching MPRs side by side, and against the reference MPR. It is contemplated that the user may wish to slightly adjust one or more of the matching MPRs as a "fine tuning" operation. This fine tuning could be performed after each matching MPR is identified, or it could be performed at the end, once all of the matching MPRs are identified.

The algorithm is flexible, and may identify matching MPRs using only the volume information (i.e., the list of volumes) provided by the user. It will be appreciated that this may not be the most efficient approach from a pure processing standpoint. Alternatively, the user may provide the system with information aimed to guide the algorithm to a more quick identification of a matching MPR for a given comparison volume. As previously noted, this could include providing the system with the position coordinates of the reference MPR within the reference volume. By and large, the patient's anatomy and position on the scanning bed or table will not change significantly between scans, and thus this may provide a good initial guess.

Thus, in addition to the list of volumes, the user must specify the reference MPR or the reference MPR location parameters, or a reference image as input. The user may also specify particular MPR locational parameters, such as orientation, translation, location of center, zoom or voxel spacing (i.e., resolution), or patient positioning information (e.g., whether the patient's position on the scanning table or bed has changed between scans). The user may also provide acquisition parameters (e.g., intensity of image, quality of image) and the like. These particular MPR parameters may be estimated using the corresponding parameters from the reference MPR. Typically, the particular MPR parameters will be provided in a range, to ensure that slight differences between the reference and comparison volumes are taken into account when performing the comparison.

Additional MPR locational criteria may also include identifying criteria supplied by the user who has marked a region of interest in the reference MPR. These markings may be made by the user on the reference MPR, and would then be used as reference when searching for matching MPRs in the subsequent comparison volumes. In one example, clicking on a region of interest in the reference MPR may result in the comparison algorithm according more "weight" to that area, thus ensuring that a higher degree of correspondence is required for the identified portion in the subsequent MPR's. Anther way of providing such markings may include a scribble (e.g., marking a line or several lines to receive higher correspondence "weighting"). Additionally, segmentation techniques (e.g. graphcuts, wathershed, . . . ) may be used for region of interest.

In one embodiment, rather than specifying a general location within a comparison volume to be searched, the user may simply specify the exact comparison MPR to be used. This may be of value, for example, when a patient is being monitored over an extended period of time, and specific matching MPRs from previous scan volumes have already been identified and stored. In this way, only the most recent comparison volume must be analyzed to find a matching MPR.

It will be appreciated that the process can store the images of the matching MPRs from several comparison volumes so that the images can be quickly retrieved and compared by a user. Alternatively, the process can store locational information about where each matching MPR can be found within the associated comparison volume, thus enabling the MPRs to be retrieved quickly as desired for viewing.

The output from the process may comprise one or more of the following: (1) an MPR image for each search volume, (2) MPR parameters (orientation, translation and pixel spacing) for each search volume, or both. The resulting MPRs may be viewed side-by-side by the user as static images (where the images themselves are stored), or as images generated on-the-fly using the specific MPR locational parameters and the search volume (where only the locational data regarding the MPRs is stored). In the latter case, the MPR may be displayed though a visualization engine, which may allow fine tuning or modifying of the MPR by the user.

Suggested Algorithm

A variety of algorithms and techniques exist for performing 2D-3D registration, yet none are particularly well suited for this application. This sub-section presents an exemplary algorithm for implementing the inventive system.

The algorithm may be based on a multi-scaling premise, in which comparison operations are performed at different resolutions. Thus, initially many operations may be performed on a very low resolution with the intention of finding a rough location to focus on. Subsequent operations can be performed at increased resolution.

Since a typical volume may consist of a very large amount of data (e.g., a 512 cube of data), performing all of the comparison calculations on the full data set would be inefficient and time consuming. Thus, the inventive system may employ downsampling or interpolation techniques to reduce the total amount of data that is initially processed. In one exemplary embodiment, the initial data subset may be reduced from a 512 cube to a 34 cube of data. The initial matching calculations may then be performed on this reduced data set in a faster, more efficient manner, to achieve an initial "rough" estimation of the location of one or more matching MPRs. Following this low-resolution approach, the resolution may be increased and refinement operations performed (e.g., a 128 cube of data may be used in lieu of the 34 cube). This process may proceed for several iterations until a matching MPR is identified.

Furthermore, this multi-scaling approach may be used to provide different scalings within a single comparison volume. For example, if the user specifies a "region of interest" in the volume using one or more mouse clicks, scribbles, or the like, then a high resolution may be applied to that portion of the volume, while interpolation or downsampling may be applied to those portions of the volume that are outside the region of interest.

The reduced resolution portions of the comparison volumes used by the algorithm may comprise newly generated data volumes, or they may simply comprise "maps" for sampling the original 512 cube data set.

Figure 3:
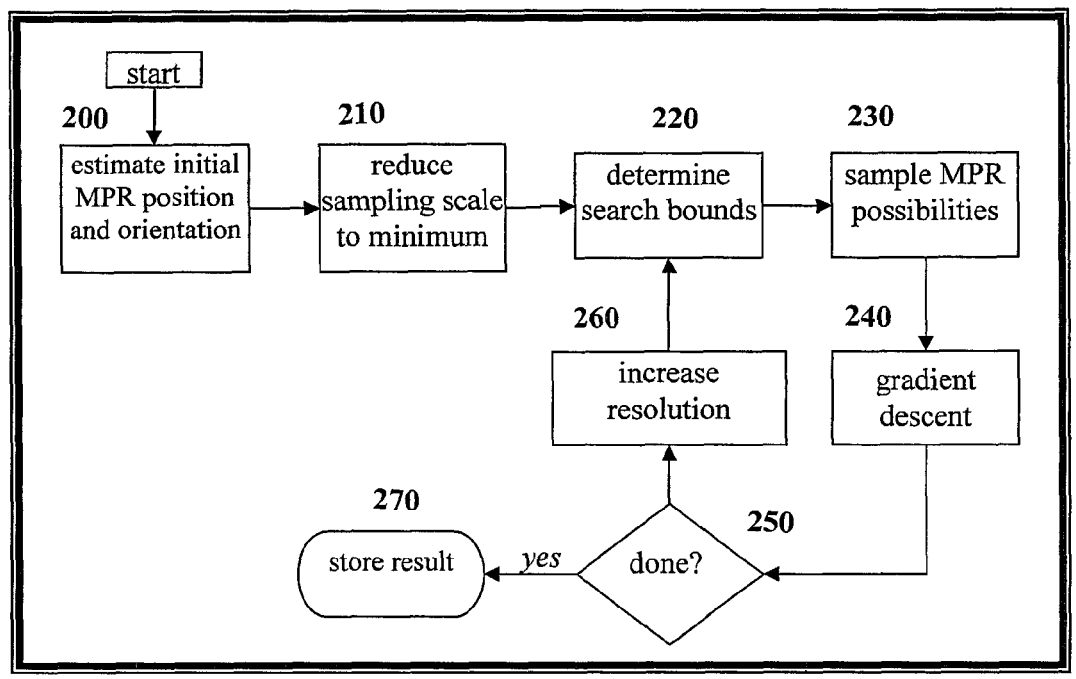
FIG. 3 is a flow chart illustrating an exemplary algorithm for implementing the inventive system.

FIG. 3 shows the flow of an exemplary algorithm for use with the inventive system. The algorithm input may be as described above. Thus, at 200 the algorithm may begin simply with a comparison volume and may make its own initial "guess" at a matching MPR position. Alternatively, the algorithm may be provided with a "head start," such as where user-supplied positional information is provided, for example, one or more coordinates of the reference MPR (translation, rotation, etc.), a user-defined "region of interest," or the like.

Where patient position, reference MPR parameters and search volume parameters are provided, the reference MPR parameters are applied to the comparison volume and adjusted to account for any changes in patient position and orientation between volumes. Further, the comparison volume scale may be adjusted to match that of the reference volume, to account for any differences in scale that may exist between volumes.

If only the reference MPR parameters are available, then the reference MPR parameters are used as the initial estimation. Alternatively, if no information is provided to the algorithm, an initial "guess" MPR may be placed in the center of the comparison volume (e.g., it may be given an arbitrary orientation and translation within the volume) and provided with an arbitrary orientation that best fits the search volume size.

At 210, the MPR volume resolution is reduced to enhance processing speed as previously noted. The pixel spacing may be increased so that the MPR image resolution decreases. The new resolution size may be set according to one of the following schemes:

a. A predefined resolution size, for example 32 pixels or a lower resolution MPR image, or b. The resolution is determined using a predefined physical size, for example, a pixel spacing of 2 millimeters.

At 220, search bounds are determined. The maximal probable change in translation and orientation is determined between the reference MPR and the "estimated" MPR parameters. This is done based on the amount of information available in block 210 as well as the physical limitations in translation of the acquisition device and patient position. For example, the vertical change in patient position can be estimated to be small due the limited number of ways in which the patient may lay in or on the acquisition device (e.g., up to 4 centimeters beyond the reference.)

At 230, MPR possibilities are sampled. The search space bounded in 220 is scanned by sampling different combinations of orientations and translations of potential matching MPRs. The sampling density is determined automatically according to the resolution and the machine speed. As will be appreciated, the faster the machine speed, the more sampling can be performed with-in a given time frame. A sample is defined as an MPR at a certain orientation and translation in the comparison volume using a specified resolution (pixel spacing). Each sample MPR is then compared with the reference MPR using one or more comparison functions. Examples of possible comparison functions used to perform this comparison are:

a. Normalized correlation–$\Sigma a_i b_i/(\Sigma a_i \Sigma b_i)$; where $a_i$=pixel i of reference MPR; and $b_i$=corresponding pixel i of compared MPR b. Sum squared difference–$\Sigma(a_i-b_i)^2$ Additionally, the comparison method may be weighted (by processing time, scale, etc.), according to the point or region of interest. Exemplary methods of applying such weighting are as follows:

a. Using the center of the MPR as the point of interest (typically when no other information is available) and decreasing the weight gradually when approaching the edge of the MPR (i.e. Gaussian function);

b. Utilizing a user input (coordinate marking or scribble) to give higher weight to marked areas; or c. Giving higher weight to the portion of the MPR inside a provided segmentation.

If both the reference volume and the reference MPR parameters are available, it is possible to base the comparison using more information than just the 2D MPR images. For example, it may be possible to:

a. Use a portion of the comparison volume that is slightly wider than the reference MPR. This would take into comparison a 3D portion of the volume which is slightly thicker than the MPR;

b. Include the two MPRs which are orthogonal to the MPR plane. The 3 MPRs are used for simultaneously for comparison and may give a better anatomic comparison score rather than using a singe MPR; or c. A combination of (a) and (b)

It will be appreciated that when performing comparisons using low resolution, a wider/thicker initial slice may be used as the starting point. When using higher scaling, however, it may be prudent to avoid such extended comparisons to keep the algorithm runtime reasonable and keep the focus on the MPR plane. Thus, the most effective course may be to perform initial processing and comparisons at low resolution, and then to increase the resolution when approaching the matching MPR.

Once the most compatible MPR from block 230 is obtained, a gradient descent method is performed 240 to obtain a better comparison score between the MPR and the reference MPR. For example, where a normalized correlation comparison function is used, $\Sigma a_i b_i/(\Sigma a_i \Sigma b_i)$ will result in this comparison score where the lower the score the more similar the two MPRs. The gradient descent method would lower the score.

The orientation and translation of the search MPR continue to be modified as long as the search MPR becomes more similar to the reference MPR. This may comprise taking incremental steps around the MPR location and angles, in a plurality of directions, moving in the direction of a decrease in the comparison score, to determine whether a minima has been reached. This may further include taking iterative steps away from the minima to confirm that the minima is a true minima and not simply a local minima.

When a minima/maxima (depending on the comparison function) is reached, the search MPR is considered locally to be most similar to the reference MPR referenced by the comparison method/function. It will be appreciated that this step (block 240) does not necessarily need to be implemented as a gradient descent, and an equivalent method may be substituted, such as, parameter change trial and error and the like.

At block 250 the stop condition of the algorithm is applied to determine whether the matching process is completed, or if further processing is required. The stop condition may be based on any of the following:

a. Resolution (pixel spacing) of MPR reached that gives most details and by further increasing the resolution nearly no new information would be added;

b. The comparison score reaches a certain threshold or is within a certain predetermined range; or c. Combination of (a) and (b)

If further processing is deemed to be required at block 250, the algorithm may implement a step (block 260) in which MPR sampling resolution is increased. As previously noted, the sampling resolution increase may be constant or adaptive. Examples of resolution increases include using a volume with half the pixel spacing, or applying the halving on-the-fly during the calculation that are done doing the creation of the MPR image.

Once the resolution is increased at block 260, the algorithm again proceeds through blocks 220-250 as previously noted until the stop condition (at block 250) is satisfied. Once the stop condition is satisfied, the algorithm stores the result, which may include the search MPR parameters, the search MPR image, or both.

The MPR image shown or generated using the MPR parameters may then be shown to the user via the display device. The user may fine tune the automatically-positioned MPR to obtain a final comparison MPR. The user may view one or more of the matching MPRs side by side and continue with the diagnostics.

The invention described herein may be automated by, for example, tangibly embodying a program of instructions upon a computer readable storage media, capable of being read by machine capable of executing the instructions. A general purpose computer is one example of such a machine. Examples of appropriate storage media are well known in the art and would include such devices as a readable or writeable CD, flash memory chips (e.g., thumb drive), various magnetic storage media, and the like.

The features of the invention have been disclosed, and further variations will be apparent to persons skilled in the art. All such variations are considered to be within the scope of the appended claims. Reference should be made to the appended claims, rather than the foregoing specification, as indicating the true scope of the subject invention.

What is claimed is:

1. A method for automatically matching medical digital images, comprising:
   providing a first digitized volume;
   providing a second digitized volume;
   selecting a first MPR from the first digitized volume;
   selecting a second MPR from the second digitized volume;
   positioning the second MPR adjacent to the first MPR to compare the first and second MPRs;
   computing a comparison score that represents a correspondence between at least a portion of each of the first and second MPRs;
   determining whether the comparison score is within a predetermined range;
   identifying the second MPR as a matching MPR if the comparison score is within the predetermined range; or
   obtaining a third MPR from the second digitized volume if the comparison score is not within the predetermined range.

2. The method of claim 1, wherein the first digitized volume represents a portion of a patient anatomy at a first time point and the second digitized volume represents the portion of the patient anatomy at a second time point, the first time point being earlier than the second time point.

3. The method of claim 1, wherein the step of selecting a second MPR from the second digitized volume comprises selecting the second MPR from a portion of the second digitized volume that generally corresponds to a corresponding position of the first digitized volume that contains the first MPR.

4. The method of claim 3, wherein the step of computing a comparison score comprises using a gradient descent technique.

5. The method of claim 1, further comprising the step of comparing the first MPR with the matching MPR to diagnose a patient condition.

6. The method of claim 1, wherein the first and second MPRs are constructed using computed tomography (CT), magnetic resonance imaging (MRI), or positron emission tomography (PET) techniques.

7. The system of claim 6, wherein the first digitized volume represents a portion of a patient anatomy at a first time point and the second digitized volume represents the portion of the patient anatomy at a second time point, the first time point being earlier than the second time point.

8. A system for automatically matching medical digital images, comprising:
   means for providing a first digitized volume;
   means for providing a second digitized volume;
   means for selecting a first MPR from the first digitized volume;
   means for selecting a second MPR from the second digitized volume;
   means for positioning the second MPR adjacent to the first MPR to compare the first and second MPRs;
   means for computing a comparison score that represents a correspondence between at least a portion of each of the first and second MPRs;
   means for determining whether the comparison score is within a predetermined range;
   means for identifying the second MPR as a matching MPR if the comparison score is within the predetermined range; or
   means for obtaining a third MPR from the second digitized volume if the comparison score is not within the predetermined range.

9. The system of claim 8, wherein the means for selecting a second MPR from the second digitized volume selects the second MPR from a portion of the second digitized volume that generally corresponds to a corresponding position of the first digitized volume that contains the first MPR.

10. The system of claim 8, wherein the means for computing a comparison score utilizes a gradient descent technique.

11. The system of claim 8, wherein the first MPR is comparable with the matching MPR to diagnose a patient condition.

12. The system of claim 8, wherein the means for computing a comparison score comprises means for performing computations on the second MPR at a plurality of discrete data resolutions.

13. The system of claim 8, wherein the first and second digitized volumes are constructed using computed tomography (CT), magnetic resonance imaging (MRI), or positron emission tomography (PET) techniques.

14. A machine readable storage device tangibly embodying a series of instructions executable by the machine to perform a series of steps, the steps comprising:
   providing a first digitized volume;
   providing a second digitized volume;
   selecting a first MPR from the first digitized volume;
   selecting a second MPR from the second digitized volume;
   positioning the second MPR adjacent to the first MPR to compare the first and second MPRs;
   computing a comparison score that represents a correspondence between at least a portion of each of the first and second MPRs;
   determining whether the comparison score is within a predetermined range;
   identifying the second MPR as a matching MPR if the comparison score is within the predetermined range; or
   obtaining a third MPR from the second digitized volume if the comparison score is not within the predetermined range.

15. The machine readable storage device of claim 14, wherein the first digitized volume represents a portion of a patient anatomy at a first time point and the second digitized volume represents the portion of the patient anatomy at a second time point, the first time point being earlier than the second time point.

16. The machine readable storage device of claim 14, wherein the step of selecting a second MPR from the second digitized volume comprises selecting the second MPR from a portion of the second digitized volume that generally corresponds to a corresponding position of the first digitized volume containing the first MPR.

17. The machine readable storage device of claim 14, wherein the step of computing a comparison score utilizes a gradient descent technique.

18. The machine readable storage device of claim 14, further comprising the step of comparing the first MPR with the matching MPR to diagnose a patient condition.

19. The machine readable storage device of claim 14, wherein step of computing a comparison score includes performing computations on the second MPR at a plurality of discrete data resolutions.

20. The machine readable storage device of claim 14, wherein the first and second digitized volumes are constructed using computed tomography (CT), magnetic resonance imaging (MRI), or positron emission tomography (PET) techniques.

* * * * *